United States Patent
Kang et al.

(10) Patent No.: US 10,081,225 B2
(45) Date of Patent: Sep. 25, 2018

(54) VEHICLE AIR CONDITIONER SLOTTED MODE CAM

(71) Applicant: HANON SYSTEMS, Daejeon (KR)

(72) Inventors: In Keun Kang, Daejeon (KR); Jae Woo Ko, Daejeon (KR); Sae Dong Eom, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 373 days.

(21) Appl. No.: 14/967,439

(22) Filed: Dec. 14, 2015

(65) Prior Publication Data
US 2016/0167477 A1 Jun. 16, 2016

(30) Foreign Application Priority Data

Dec. 15, 2014 (KR) .................. 10-2014-0179991
Nov. 30, 2015 (KR) .................. 10-2015-0168512

(51) Int. Cl.
*B60H 1/00* (2006.01)

(52) U.S. Cl.
CPC ..... *B60H 1/00857* (2013.01); *B60H 1/00064* (2013.01); *B60H 2001/002* (2013.01); *B60H 2001/00192* (2013.01)

(58) Field of Classification Search
CPC ........... B60H 1/00857; B60H 1/00835; B60H 1/00899; B60H 1/00064; B60H 2001/00192; B60H 2001/002; B60H 2001/00707

See application file for complete search history.

(56) References Cited

U.S. PATENT DOCUMENTS

| | | | | |
|---|---|---|---|---|
| 4,702,307 A | * | 10/1987 | Ito .................. | B60H 1/00857 165/42 |
| 5,181,553 A | * | 1/1993 | Doi .................. | B60H 1/00842 165/203 |
| 6,702,008 B1 | * | 3/2004 | Hibino ............... | B60H 1/00842 165/202 |
| 2002/0195227 A1 | * | 12/2002 | Ito .................. | B60H 1/00842 165/41 |
| 2009/0250193 A1 | * | 10/2009 | Ishikawa ............ | B60H 1/00028 165/61 |

(Continued)

FOREIGN PATENT DOCUMENTS

| JP | 56131414 A | 10/1981 |
|---|---|---|
| KR | 20040101864 A | 12/2004 |

(Continued)

*Primary Examiner* — Travis Ruby
(74) *Attorney, Agent, or Firm* — Dickinson Wright PLLC (57) ABSTRACT

An air conditioner including a defrost vent, a face vent, floor vents and a console vent to discharge air. A console door adjusts the degree of opening of the console vent. A console air volume distribution means comprises a console slot which is formed on a mode cam and is connected with a rotary shaft of the console door to carry out cam motion. The console slot includes a closing slot part, an opening slot part and a middle slot part. The opening slot part, the middle slot part and the closing slot part are arranged such that the degree of opening of the console vent is reduced while an air discharge mode of the air conditioner is changed successively from a face mode to a bi-level mode, a floor mode, a mixing mode and a defrost mode.

8 Claims, 10 Drawing Sheets

(56) References Cited

U.S. PATENT DOCUMENTS

2011/0162409 A1\* 7/2011 Okumura ........... B60H 1/00842
                                                          62/498
2013/0065498 A1\* 3/2013 Hara .................. B60H 1/00857
                                                          454/69
2013/0288586 A1    10/2013 Jang

FOREIGN PATENT DOCUMENTS

KR    1020040102786 A    12/2004
KR    1020140089100 A    7/2014

\* cited by examiner

Fig. 1

PRIOR ART

VEHICLE AIR CONDITIONER SLOTTED MODE CAM

CROSS-REFERENCE TO RELATED APPLICATIONS

This application claims the benefit and priority of KR 10-2014-0179991, filed Dec. 15, 2014 and KR 10-2015-0168512, filed Nov. 30, 2015. The entire disclosures of each of the above applications are incorporated herein by reference.

BACKGROUND OF THE INVENTION

Field of the Invention

The present invention relates to an air conditioner for a vehicle, and more particularly, to an air conditioner for a vehicle, which includes console air volume distribution means formed on a mode cam to control the degree of opening of a console door, thereby varying distribution of air volume of a console vent by air discharge modes.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

According to mounted structures of an air blower unit, an evaporator unit and a heater core unit, such an air conditioner is classified into a three-piece type air conditioner where the air blower unit, the evaporator unit, and the heater core unit are disposed independently, a semi-center type air conditioner where the evaporator unit and the heater core unit are embedded in an air-conditioning case and the air blower unit is mounted separately, and a center-mounting type air conditioner where the three units are all embedded in the air-conditioning case.

Recently, an independent type air conditioner, which separately and independently provides air of different temperatures to a driver's seat and to a passenger's seat inside the vehicle to thereby individually heat and cool the seats according to the driver's or the passenger's need, has been disclosed.

Figure 1:
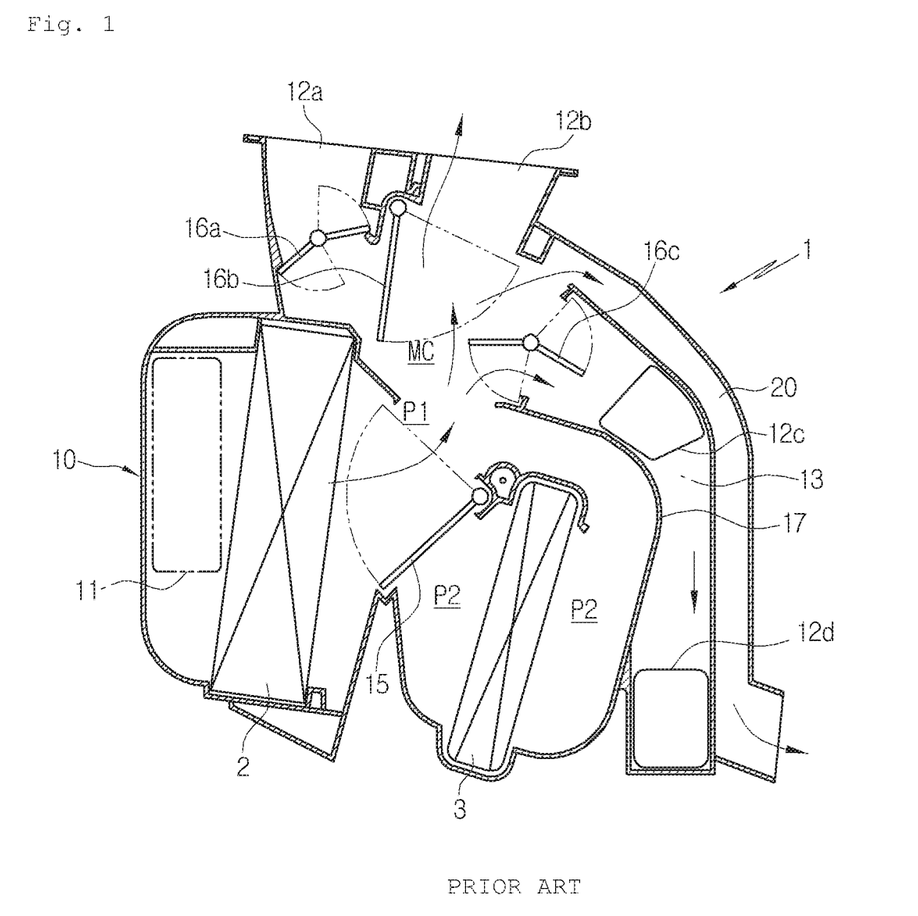
FIG. 1 is a sectional view of a conventional air conditioner for a vehicle.
Figure 2:
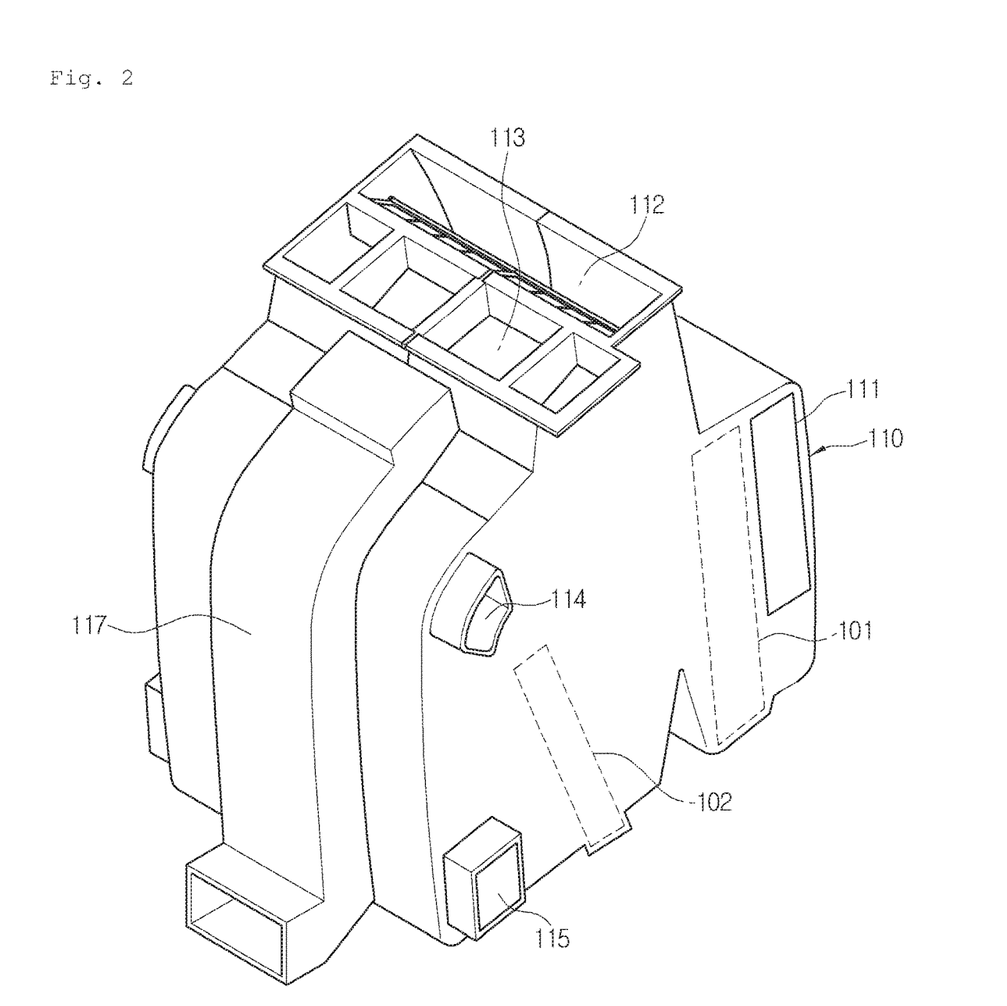
FIG. 2 is a perspective view of an air conditioner for a vehicle according a preferred embodiment of the present invention.
Figure 3:
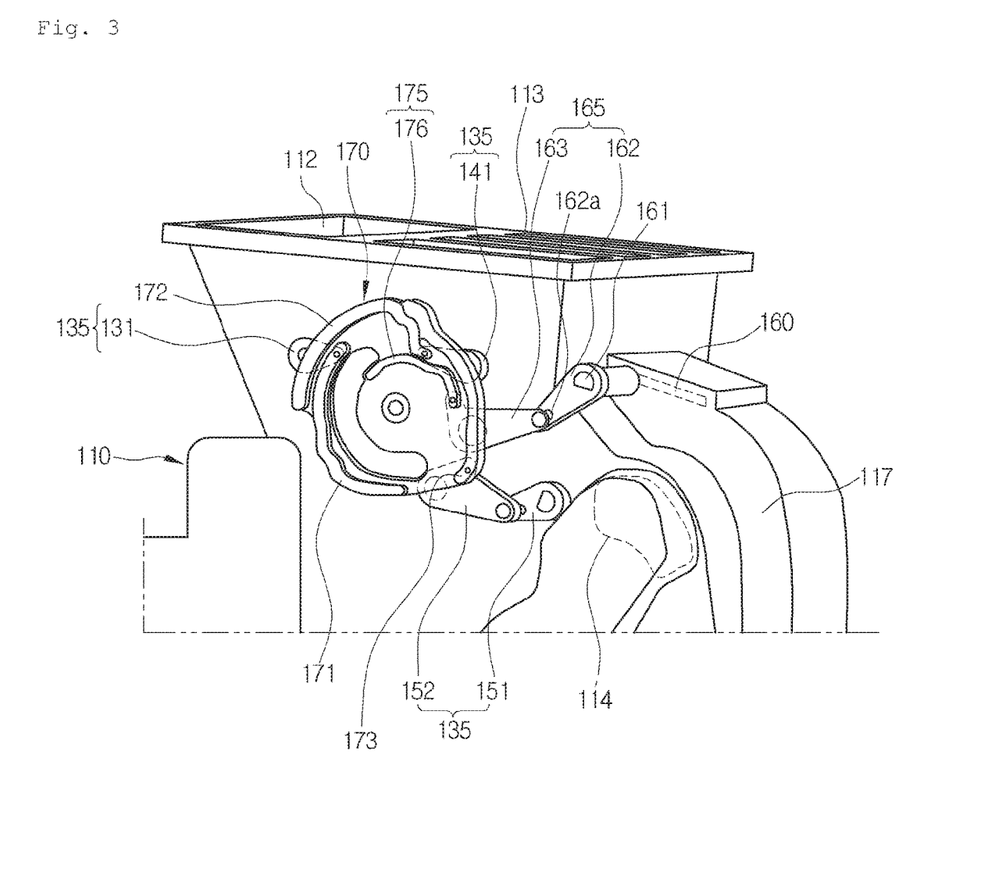
FIG. 3 is a partially perspective view showing a part where a mode cam is mounted in the air conditioner for the vehicle according to the preferred embodiment of the present invention.

FIG. 1 is a sectional view of a conventional air conditioner for a vehicle. In FIG. 1, the air conditioner 1 includes: an air-conditioning case 10 having an air inflow port 11 formed at one side thereof and a defrost vent 12a, a face vent 12b and floor vents 12c and 12d formed at the other side thereof in such a way as to be adjusted in degree of opening by mode doors 16a, 16b and 16c; an evaporator 2 and a heater core 3 that are mounted on air passageways in the air-conditioning case 10 in order and spaced apart from each other at a predetermined interval; and an air blower (not shown) connected to the air inflow port 11 of the air-conditioning case 10 for sending indoor air or outdoor air.

Moreover, the air conditioner further includes a temperature-adjusting door 15 mounted between the evaporator 2 and the heater core 3 for controlling temperature by adjusting the degree of opening of a cold air passageway P1 bypassing the heater core 3 and of a warm air passageway P2 passing through the heater core 3.

Furthermore, the mode doors 16a, 16b and 16c control the degree of opening of the relevant vents and carry out various air discharge modes, namely, a vent mode, a bi-level mode, a floor mode, a mixing mode, and a defrost mode.

Additionally, the air-conditioning case 10 has a floor channel 13 which is formed therein and is partitioned by a partition wall 17 from the warm air passageway P2 located at the rear side of the heater core 3, and the floor channel 13 guides the air inside the air-conditioning case 10 to the floor vents 12c and 12d.

Here, the floor vents 12c and 12d are divided into the floor vent 12c for a front seat and the floor vent 12d for a rear seat and diverge from the floor channel 13.

In addition, because there is a severe difference in temperature between the front seat and the rear seat, in order to solve the problem, a console vent 20 for supplying air-conditioning air to the rear seat space by inducing discharge of air toward a console box (not shown) which is the central portion of the inside of the vehicle is formed on the outer surface of the air-conditioning case 10 at the rear side of the floor channel 13.

Therefore, in order to heat or cool the rear seat space, the air is guided toward the console box through the console vent 20, and then, is supplied to the rear seat space.

As described above, in the air conditioner 1 for the vehicle, in case of the greatest cooling mode, the temperature-adjusting door 15 opens the cold air passageway P1 and closes the warm air passageway P2. Therefore, the air blown by the air blower (not shown) exchanges heat with refrigerant flowing inside the evaporator 2 while passing through the evaporator 2, and is converted into cold air. After that, the converted air flows toward a mixing chamber MC through the cold air passageway P1, and then, is discharged to the inside of the vehicle through the vents opened by the mode doors 16a, 16b and 16c according to the predetermined air discharge modes, namely, the vent mode, the bi-level mode, the floor mode, the mixing mode and the defrost mode, so as to cool the inside of the vehicle.

Moreover, in the case of the greatest heating mode, the temperature-adjusting door 15 closes the cold air passageway P1 and opens the warm air passageway P2. Accordingly, the air blown by the air blower (not shown) passes through the evaporator 2, and then, is converted into warm air by exchanging heat with cooling water flowing inside the heater core 3 while passing through the heater core 3 through the warm air passageway P2. After that, the converted air flows toward the mixing chamber MC, and then, is discharged to the inside of the vehicle through the vents opened by the mode doors 16a, 16b and 16c according to the predetermined air discharge modes, so as to heat the inside of the vehicle.

In the greatest cooling mode and the greatest heating mode, air is also supplied to the console vent 20 which is always opened so as to cool and heat the rear seat space.

However, in case of the conventional air conditioner, because the console vent 20 is opened the greatest even in the floor mode and the mixing mode which are the air discharge mode of the heating mode, the air is excessively discharged to the console vent 20, and it increases displeasure of the passenger who is seating on the rear seat and causes the lack of air volume of the front seat due to the excessive air volume of the rear seat.

In the meantime, a console door may be installed on the console vent 20, but, in this instance, the console door just functions to open the greatest or close the console vent 20.

In other words, the console door closes the console vent 20 only in the defrost mode, but opens the console vent 20 the greatest in the face mode, the bi-level mode, the floor mode and the mixing mode. Therefore, the air conditioner for the vehicle having the console door still has the above-mentioned problem.

SUMMARY OF THE INVENTION

Accordingly, the present invention has been made to solve the above-mentioned problems occurring in the prior arts, and it is an object of the present invention to provide an air conditioner for a vehicle, which includes console air volume distribution means formed on a mode cam to control the degree of opening of a console door, thereby varying distribution of air volume of a console vent by air discharge modes, thereby preventing an excessive discharge of air to a console vent (rear seat) by regulating the console vent to be opened less in a floor mode and a mixing mode, which are air discharge modes of a heating mode, than when the console vent is opened the greatest, preventing displeasure of a passenger who is seating on a rear seat, enhancing heating performance, and preventing the lack of air volume in a front seat.

To accomplish the above object, according to the present invention, there is provided an air conditioner for a vehicle including: an air-conditioning case which has a defrost vent, a face vent and floor vents to discharge air introduced through an air inflow port; a defrost door, a face door and a floor door which are respectively rotatably mounted through rotary shafts inside the air-conditioning case to adjust the degrees of opening of the each vents; and a mode cam which has at least one slot connected with the rotary shaft of at least one of the doors through connecting means to make the connecting means carry out a cam motion so as to individually adjust the degree of opening of the door connected to the slot while rotating at a predetermined angle according to air discharge modes, wherein the air-conditioning case includes a console vent for discharging air toward the rear seat of the vehicle and a console door for adjusting the degree of opening of the console vent, and the mode cam includes console air volume distribution means which varies distribution of air volume of the console vent according to the air discharge modes in order to adjust the degree of opening of the console door.

According to the present invention, because the air conditioner for the vehicle includes console air volume distribution means formed on a mode cam to control the degree of opening of a console door in order to vary distribution of air volume of a console vent by air discharge modes, the air conditioner for the vehicle can prevent an excessive discharge of air to a console vent (rear seat) by regulating the console vent to be opened less in a floor mode and a mixing mode, which are air discharge modes of a heating mode, than when the console vent is opened the greatest, prevent displeasure of a passenger who is seating on a rear seat, enhance heating performance, and prevent the lack of air volume in a front seat.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiments of the present invention with reference to the attached drawings.

As shown in the drawing, an air conditioner 100 for a vehicle according to a preferred embodiment of the present invention includes: an air-conditioning case 110 having an air inflow port 111 formed on one side thereof, a plurality of air outflow ports formed on the other side for discharging the air introduced from the air inflow port 111, and an cold air passageway P1 and a warm air passageway P2 formed in an air passageway formed therein; an evaporator 101 and a heater 102 spaced apart from each other at a predetermined interval in the air passageway inside the air-conditioning case 110; and a temperature-adjusting door 120 mounted between the evaporator 101 and the heater 102 for adjusting the degree of opening of the cold air passageway P1, which bypasses the heater 102, and the degree of opening of the warm air passageway P2, which passes through the heater 102.

The evaporator 101 is mounted at the upstream side of the cold air passageway P1 inside the air-conditioning case 110, and the heater core 102 is mounted inside the warm air passageway P2.

In this instance, the cold air passageway P1 is formed in such a way that the air passing the evaporator 101 bypasses the heater core 102 inside the air-conditioning case 110, and the warm air passageway P2 is formed in such a way that the air passing the evaporator 101 is branched from the cold air passageway P1, makes a U-turn after passing the heater core 102, and then, is joined with the cold air passageway P1 again.

In the meantime, a mixing chamber MC where cold air and warm air are mixed together is formed at the area where the cold air passageway P1 and the warm air passageway P2 are joined together inside the air-conditioning case 110.

Moreover, an air blower (not shown) for blowing indoor air or outdoor air is mounted at the air inflow port 111 of the air-conditioning case 110.

Furthermore, the air outflow ports formed at an outlet of the air-conditioning case 110 includes a defrost vent 112 for discharging air toward the front window of the vehicle, a face vent 113 for discharging air toward the front seat passenger's face, and floor vents 114 and 115 for discharge air toward the passenger's feet.

Here, the face vent 113 is divided into a center vent (not shown) formed at the central portion of the inside of the vehicle and side bents (not shown) formed at both sides of the inside of the vehicle to separately discharge the air.

Additionally, the floor vents 114 and 115 are branched into the floor vent 114 for the front seat for discharging air toward the front seat passenger's feet and the floor vent 115 for the rear seat for discharging air toward the rear seat passenger's feet.

In addition, a defrost door 130, a face door 140 and a floor door 150 which are mode doors are disposed to adjust the degrees of opening of the defrost vent 112, the face vent 113 and the floor vents 114 and 115.

The defrost door 130 is a center pivot type door and is mounted at a lower portion of the defrost vent 112, the face door 140 is a flat type door and is mounted at a lower portion of the face vent 113, and the floor door 150 is a center pivot type door and is mounted at an inlet 116a of a floor channel 116 which will be described later to open and close the floor vents 114 and 115 through opening and closing of the floor channel 116.

The defrost door 130, the face door 140, the floor door 150 and a console door 160 which will be described later are mounted by rotary shafts inside the air-conditioning case 110 to be able to rotate.

The temperature-adjusting door 120 is a flat type door and adjusts the degrees of opening of the cold air passageway P1 and the warm air passageway P2.

In the meantime, a rotary shaft of the temperature-adjusting door 120 is mounted in front of the upper end of the heater core 102 to be able to rotate.

Moreover, a partition wall 119 is formed between the warm air passageway P2 located at the rear side of the heater core 102 and the floor vents 114 and 115 to partition the warm air passageway P2 and the floor vents 114 and 115 from each other.

The partition wall 119 guides the warm air passing the heater core 102 to the mixing chamber MC.

Meanwhile, an actuator (not shown) is mounted on the outer surface of the air-conditioning case 110 in order to operate the temperature-adjusting door 120 and the mode doors 130, 140 and 150.

In this instance, the actuator may be directly connected with the doors, but may be connected with the doors through a cam, an arm or a lever. That is, when the cam is rotatably operated by operation of the actuator, the lever and the arm carry out a cam motion to operate the temperature-adjusting door 120 and the mode doors 130, 140 and 150 in order to adjust the degrees of opening of the cold air passageway P1 and the warm air passageway P2 and the degrees of opening of the vents 112 to 115.

Furthermore, the floor channel 116, which guides the air inside the air-conditioning case 110 to the floor vents 114 and 115, and a console vent 117, which is formed at the rear side of the floor channel 116 and partitioned from the floor channel 116 to supply the air toward the rear seat, are disposed inside the air-conditioning case 110.

The floor channel 116 is formed along the partition wall 119 from the rear side of the partition wall 119 to guide the air mixed in the mixing chamber MC to the floor vents 114 and 115.

The console vent 117 is disposed at the rear side of the air-conditioning case 110, is partitioned from the floor channel 116 by the partition wall 118, and supplies the air mixed in the mixing chamber MC toward the rear seat.

Additionally, an inlet 117a of the console vent 117 penetrates the partition wall 118, which partitions the console vent 117 from the floor channel 116, and is formed above an inlet 116a of the floor channel 116.

In the drawing, the inlet 117a of the console vent 117 penetrates the upper end portion of the partition wall 118 which faces the floor door 150.

As described above, because the inlet 117a of the console vent 117 is formed near the mixing chamber MC, the air mixed in the mixing chamber MC is supplied smoothly to easily control temperature.

In the meantime, an outlet of the console vent 117 is connected with the console box (not shown), which is the central portion of the inside the vehicle, through a duct (not shown) to communicate with the console box. Therefore, the air passing the console vent 117 is guided toward the console box and supplied to the rear seat space so as to cool and heat the rear seat space.

In addition, the console door 160 for opening and closing the inlet 117a of the console vent 117 is mounted.

The console door 160 is rotatably mounted on the air-conditioning case 110 through a rotary shaft 161, and in this instance, an end portion of the rotary shaft 161 is connected with auxiliary connecting means 165 mounted on the outer surface of the air-conditioning case 110.

Moreover, a mode cam 170 which has at least one slot is mounted on the outer surface of the air-conditioning case 110 and is connected with the rotary shaft of at least one of the doors through connecting means 135 to make the connecting means 135 carry out the cam motion.

Figure 4:
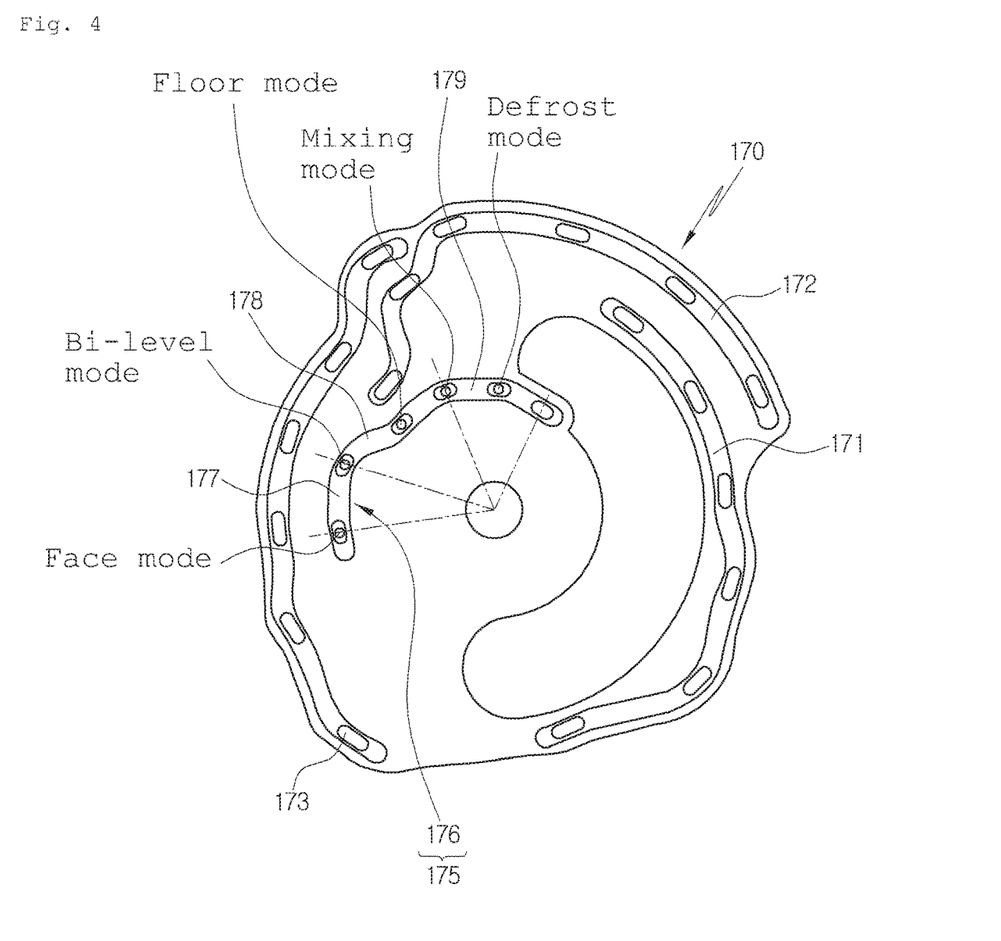
FIG. 4 is a view showing the mode cam in the air conditioner for the vehicle according to the preferred embodiment of the present invention.

The mode cam 170 illustrated in FIG. 4 has a plurality of slots 171, 172 and 173 which are respectively connected with the rotary shafts of the defrost door 130, the face door 140 and the floor door 150 through the connecting means 135.

Therefore, the mode cam 170 rotates at a predetermined angle to individually control the degrees of opening of the doors according to the air discharge modes.

The mode cam 170 is rotated by the actuator (not shown) mounted on the outer surface of the air-conditioning case 110, and the actuator is arranged on the outer surface of the mode cam 170 to be overlapped.

The connecting means 135 includes arms 131, 141 and 151 and a lever 152 for connecting the slots 171, 172 and 173 of the mode cam 170 with the rotary shafts of the doors.

That is, the defrost door 130 and the face door 140 are connected to the slots 171 and 172 of the mode cam 170 using the arms 131 and 141, and the floor door 150 is connected to the slot 173 of the mode cam 170 using the arm 151 and the lever 152.

As described above, the connecting means 135 may include the arm 151 and the lever 152 or may include only the arms 131 and 141 without having the lever.

The slots of the mode cam 170 are the slot 171 which is joined with the arm 131 connected to the rotary shaft of the defrost door 130 by a pin, the slot 172 which is joined with the arm 141 connected to the rotary shaft of the face door 140 by a pin, and the slot 173 which is joined with the arm 151 and the lever 152 connected to the rotary shaft of the floor door 150 by a pin.

In the meantime, the arms 131, 141 and 151 and the lever 152 are arranged between the outer surface of the air-conditioning case 110 and the mode cam 170.

Furthermore, the mode cam 170 includes console air volume distribution means 175 which adjusts the degree of opening of the console door 160 to vary distribution of air volume of the console vent 117 according to the air discharge modes.

The console air volume distribution means 175 includes a console slot 176 which is formed on the mode cam 170 and is connected with the rotary shaft 161 of the console door 160 through the auxiliary connecting means 165 to make the auxiliary connecting means 165 carry out the cam motion.

The console slot 176 includes: a closing slot part 179 for operating the auxiliary connecting means 165 so that the console door 160 closes the console vent 117; an opening slot part 177 for operating the auxiliary connecting means 165 so that the console door 160 opens the console vent 117 the greatest; and a middle slot part 178 for operating the auxiliary connecting means 165 so that the console door 160 opens the console vent 117 less than when the console vent 117 is opened the greatest.

The opening slot part 177, the middle slot part 178 and the closing slot part 179 of the console slot 176 are arranged in such a way that the degree of opening of the console vent 117 is gradually reduced while the air discharge mode is changed from the face mode into the bi-level mode, the floor mode, the mixing mode and the defrost mode.

FIG. 4 illustrates the slots 171, 172 and 173 and the console slot 176 of the mode cam 170. The console slot 176 has the opening slot part 177, the middle slot part 178 and the closing slot part 179 which are formed in the clockwise direction.

In this instance, the opening slot part 177, the middle slot part 178 and the closing slot part 179 are formed in such a way as to have different radiuses from the rotational center of the mode cam 170.

In other words, the opening slot part 177, the middle slot part 178 and the closing slot part 179 are formed in such a way that the radiuses are gradually reduced from the rotational center of the mode cam 170.

Therefore, when the mode cam 170 rotates at a predetermined angle so that the pin of the auxiliary connecting means 165 is located at the opening slot part 177 of the console slot 176, the console door 160 opens the console vent 117 the greatest. However, when the pin of the auxiliary connecting means 165 is located at the middle slot part 178, the console door 160 opens the console vent 117 less than (one half of the greatest opening) when the console vent 117 is opened the greatest. Moreover, when the pin of the auxiliary connecting means 165 is located at the closing slot part 179, the console door 160 closes the console vent 117.

Furthermore, when the face door 140 opens the face vent 113 the greatest, the console door 160 is connected to the opening slot part 177 of the console slot 176 through the auxiliary connecting means 165 to open the console vent 117 the greatest.

When the face door 140 closes the face vent 113, the console door 160 is connected to a position except the opening slot part 177 of the console slot 176 through the auxiliary connecting means 165 to close the console vent 117 at a predetermined angle from the greatest opening.

In other words, because air volume of the rear seat increases due to an increase of ventilation resistance to the console vent 117 when the face door closes the face vent 113, in order to prevent the increase of the air volume, the face door closes the face vent 113 so that the console door 160 closes the console vent 117 at the predetermined angle from the greatest opening.

Additionally, the air discharge mode includes the face mode, the bi-level mode, the floor mode, the mixing mode and the defrost mode, and positions of the pin of the auxiliary connecting means 165 according to the air discharge modes are illustrated in FIG. 4.

Referring to FIG. 4, in the face mode and the bi-level mode, the console vent 117 is opened the greatest through the opening slot part 177 of the console slot 176.

In the floor mode and the mixing mode, the console vent 117 is opened less than the greatest opening (one half of the greatest opening) through the middle slot part 178 of the console slot 176.

In the defrost mode, the console vent 117 is closed through the closing slot part 179 of the console slot 176.

As described above, the console slot 176 is linked with the air discharge modes from the opening slot part 177 to the middle slot part 178 and the closing slot part 179 to adjust the degree of opening of the console vent 117 by operating the console door 160.

In addition, as described above, when the console vent 117 is opened the greatest, is opened to one half of the greatest opening and is closed, air volume distribution ratios of the vents are as follows.

First, in the face mode, the console vent 117 is opened the greatest, and the air volume distribution ratios are 85% at the face vent (a center vent and a side vent) and 15% at the console vent.

In the bi-level mode, the console vent 117 is opened the greatest, and the air volume distribution ratios are 55% at the face vent (the center vent and the side vent) and 10% at the console vent.

In the floor mode, the console vent 117 is opened half, and the air volume distribution ratios are 15% at the face vent (the side vent), 50% at the floor vent, 25% at the defrost vent and 10% at the console vent.

In the mixing mode, the console vent 117 is opened half, and the air volume distribution ratios are 15% at the face vent (the side vent), 38% at the floor vent, 42% at the defrost vent and 5% at the console vent.

In the defrost mode, the console vent 117 is closed, and the air volume distribution ratios are 15% at the face vent (the side vent) and 85% at the defrost vent.

As described above, because the air volume distribution of the console vent 117 is varied according to the air discharge modes, in the floor mode and the mixing mode which are the air discharge modes of the heating mode, the console vent 117 is opened less than when the console vent 117 is opened the greatest, so as to prevent an excessive discharge of the air toward the console vent 117 (rear seat), thereby preventing displeasure of the passenger who seats on the rear seat, enhancing heating performance and preventing the lack of air volume of the front seat.

Meanwhile, the slots 171, 172 and 173 are individually formed at the edge of the mode cam 170, and the console slot 176 is formed inward from the slots 171, 172 and 173 in the mode cam 170.

Moreover, the auxiliary connecting means 165 includes: a console arm 162 which is connected to the rotary shaft 161 of the console door 160 on the outer surface of the air-conditioning case 110 and has a hole 162a of a predetermined length formed at an end portion thereof; and a console lever 163 which is rotatably connected to the outer surface of the air-conditioning case 110 and has an end portion extended to one side based on a rotational center and connected to the hole 162a of the console arm 162 by a pin and the other end portion extended to the other side and connected to the console slot 176 of the mode cam 170 by a pin. Therefore, the auxiliary connecting means 165 operates the console door 160 through the console lever 163 and the console arm 162 which carry out the cam motion along the console slot 176 when the mode cam 170 rotates.

In the meantime, in the console slot 176, a section where there is no change in radius from the rotational center of the mode cam 170 is a static section, and a section where the radius increases or decreases is a section where an actuating angle of the console door 160 is changed.

Figure 10:
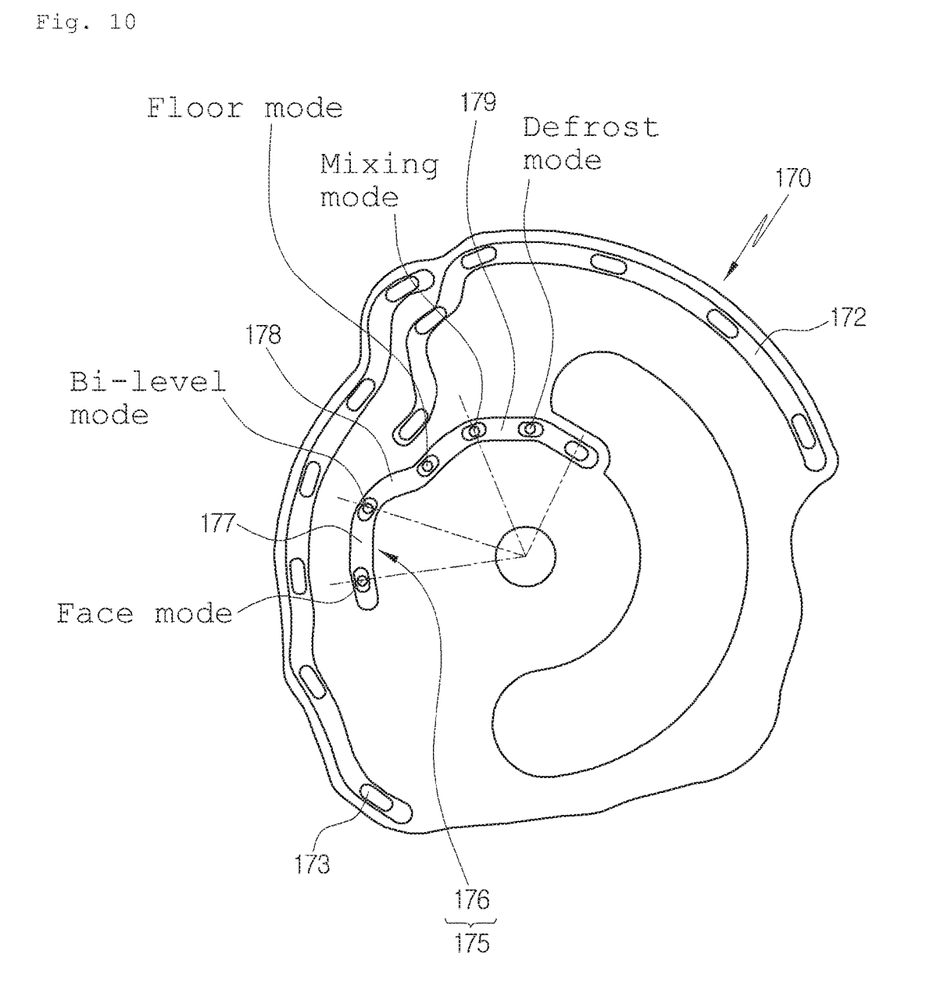
FIG. 10 is a view showing a mode cam in the air conditioner for the vehicle according to another preferred embodiment of the present invention.

FIG. 10 is a view showing a mode cam of the air conditioner for the vehicle according to another preferred embodiment of the present invention. In FIG. 10, the slot 171 of the mode cam 170 described in the former preferred embodiment to which the defrost door 130 is connected is omitted.

In this instance, the defrost door 130 is independently controlled through operating means (not shown) which is mounted on the outer surface of the air-conditioning case 110.

That is, the face door 140, the floor door 150 and the console door 160 are controlled by the mode cam 170, and the defrost door 130 is independently controlled through the operating means.

The operating means controls the defrost door 130 through the actuator.

Hereinafter, actions of the air conditioner for the vehicle according to the present invention will be described, and as an example, the face mode and the bi-level mode are in the cooling mode, and the floor mode, the mixing mode and the defrost mode are in the heating mode.

A. Face Mode (FIG. 5)

Figure 5:
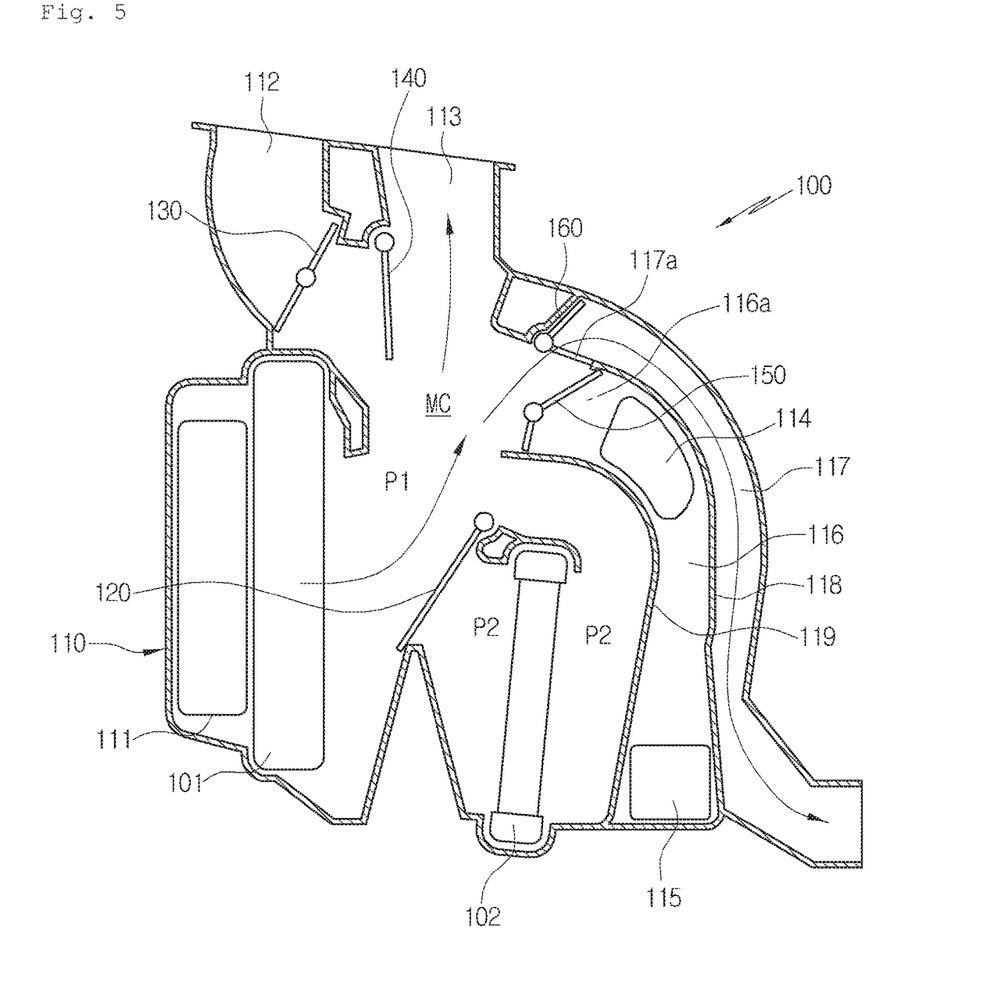
FIG. 5 is a sectional view showing a face mode of the air conditioner for the vehicle according to the preferred embodiment of the present invention.

In the face mode, as shown in FIG. 5, the face door 140 opens the face vent 113, the defrost door 130 closes the defrost vent 112, the floor door 150 closes the floor channel 116 and closes the floor vents 114 and 115, and the console door 160 opens the console vent 117 the greatest.

Moreover, the temperature-adjusting door 120 opens the cold air passageway P1.

Therefore, the air blown by the air blower (not shown) is converted into cold air while passing through the evaporator 101, and then, some of the air is discharged toward the front seat passenger's face through the face vent 113 to cool the front seat space of the vehicle and some of the air is discharged toward the rear seat passenger's face through the console vent 117 to cool the rear seat space.

B. Bi-Level Mode (FIG. 6)

Figure 6:
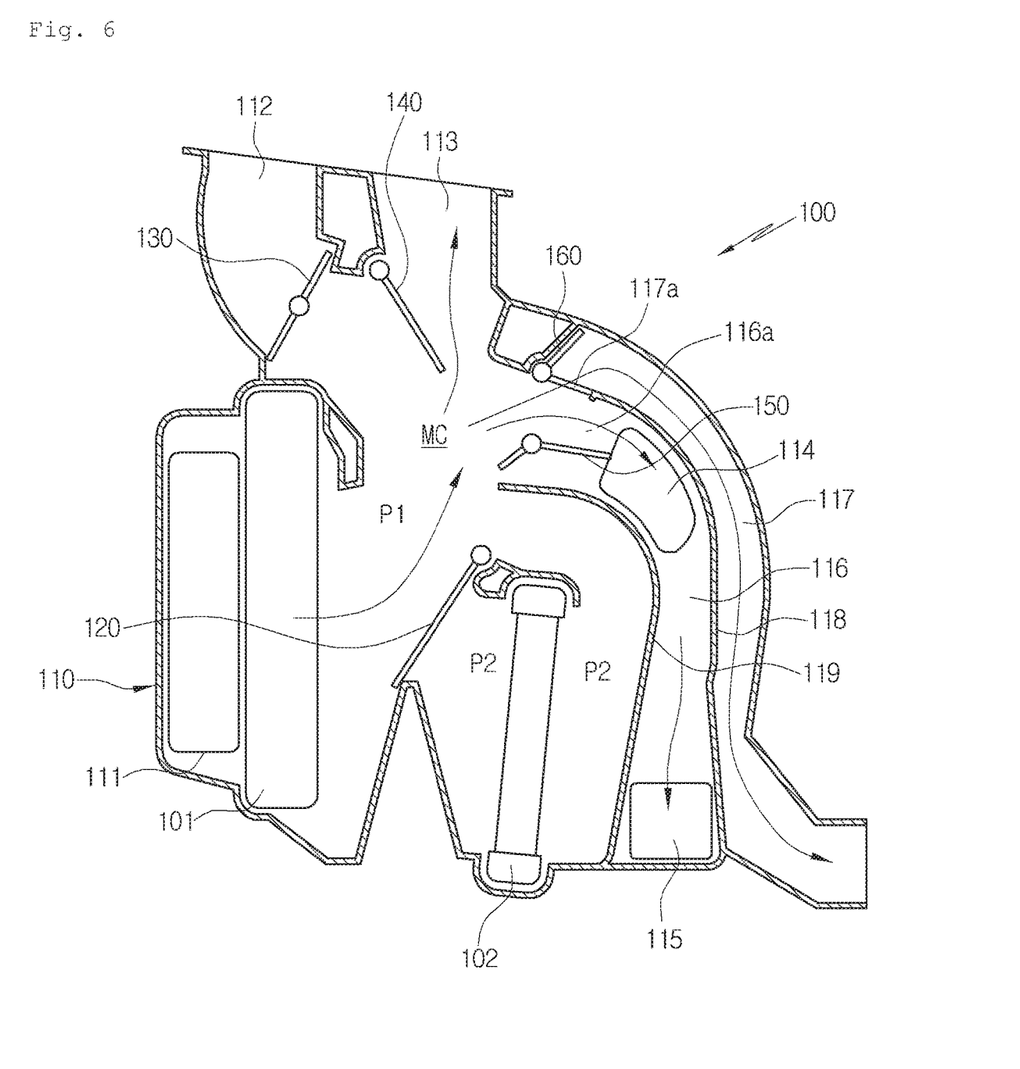
FIG. 6 is a sectional view showing a bi-level mode of the air conditioner for the vehicle according to the preferred embodiment of the present invention.

In the bi-level mode, as shown in FIG. 6, the face door 140 and the floor door 150 open the face vent 113 and the floor vents 114 and 115 at the same time, the defrost door 130 closes the defrost vent 112, and the console door 160 opens the console vent 117 the greatest.

Furthermore, the temperature-adjusting door 120 opens the cold air passageway P1.

Therefore, the air blown by the air blower (not shown) is converted into cold air while passing through the evaporator 101, and then, some of the air is discharged toward the front seat passenger's face through the face vent 113 to cool the front seat space of the vehicle, some of the air is discharged toward the rear seat passenger's face through the console vent 117 to cool the rear seat space, and some of the air is discharged toward the front seat passenger's feet and the rear seat passenger's feet through the floor channel 116 and the floor vents 114 and 115 to cool the inside of the vehicle.

C. Floor Mode (FIG. 7)

Figure 7:
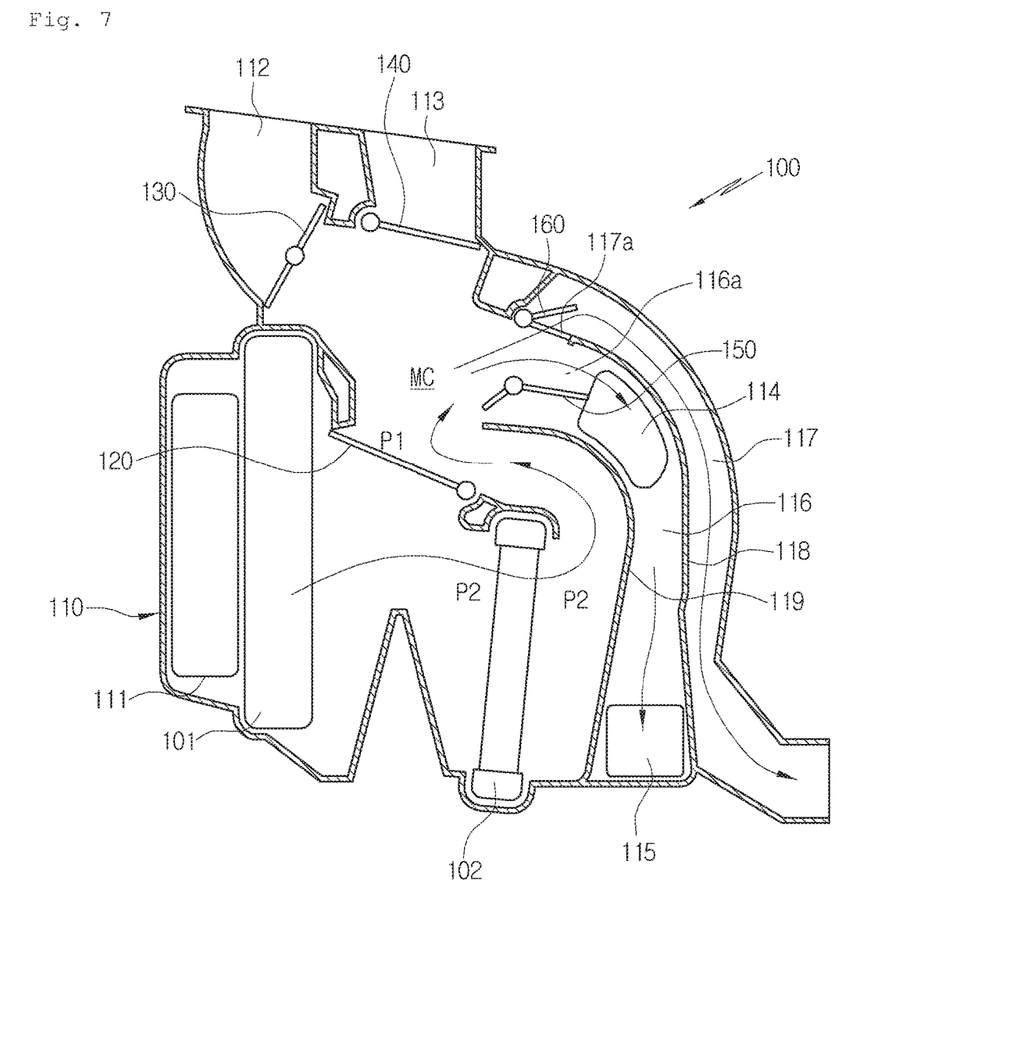
FIG. 7 is a sectional view showing a floor mode of the air conditioner for the vehicle according to the preferred embodiment of the present invention.

In the floor mode, as shown in FIG. 7, the face door 140 and the defrost door 130 closes the face vent 113 and the defrost vent 112, the floor door 150 opens the floor channel 116 to open the floor vents 114 and 115, and the console door 160 opens the console vent 117 half.

Additionally, the temperature-adjusting door 120 opens the warm air passageway P2.

Therefore, the air blown by the air blower (not shown) is heated while passing through the heater core after passing the evaporator 101. After that, some of the heated air is discharged toward the rear seat passenger's face through the console vent 117 to heat the rear seat space of the vehicle, and some of the heated air is discharged toward the front seat passenger's feet and the rear seat passenger's feet through the floor channel 116 and the floor vents 114 and 115 to heat the inside of the vehicle.

In this instance, because the console vent 117 is opened half, it can prevent the excessive discharge of the air to the console vent 117 and prevent the lack of air volume of the front seat.

D. Mixing Mode (FIG. 8)

Figure 8:
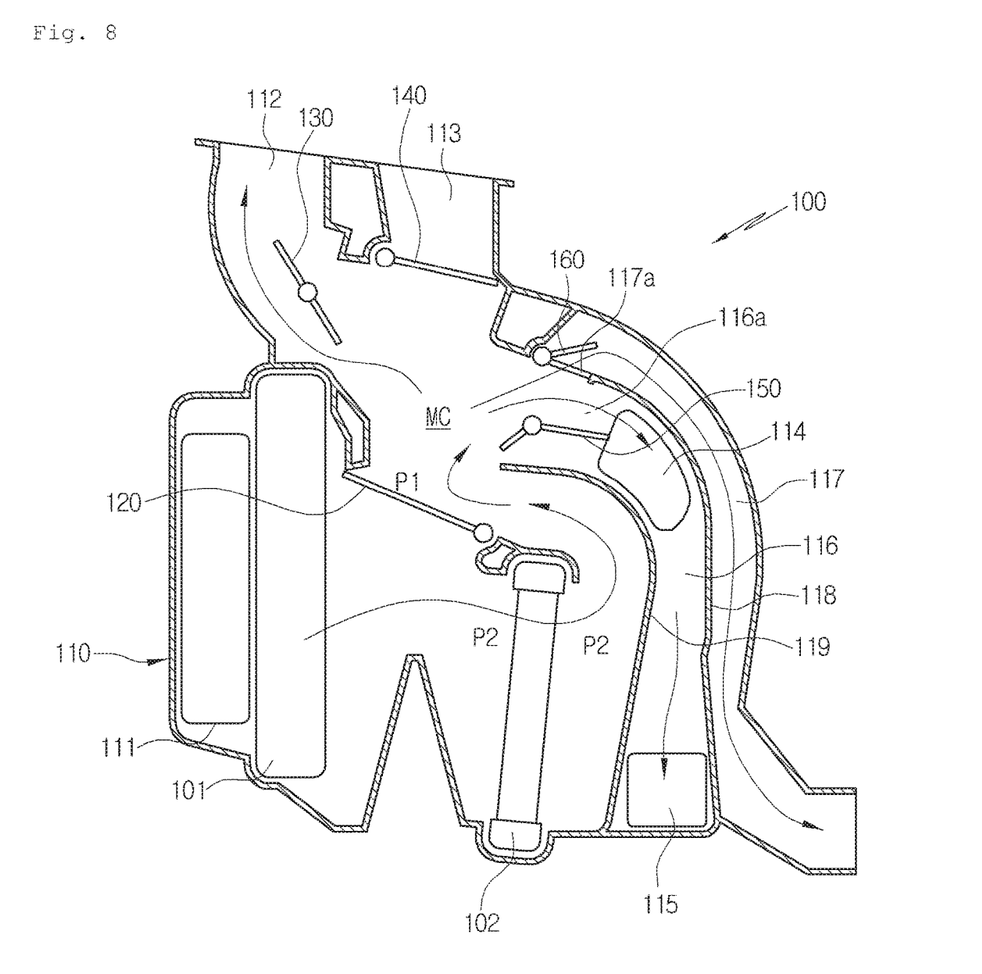
FIG. 8 is a sectional view showing a mixing mode of the air conditioner for the vehicle according to the preferred embodiment of the present invention.

In the mixing mode, as shown in FIG. 8, the face door 140 closes the face vent 113, the defrost door 130 opens the defrost vent 112, the floor door 150 opens the floor channel 116 to open the floor vents 114 and 115, and the console door 160 opens the console vent 117 half.

In addition, the temperature-adjusting door 120 opens the warm air passageway P2.

Therefore, the air blown by the air blower (not shown) is heated while passing through the heater core after passing the evaporator 101. After that, some of the heated air is discharged toward the front window through the defrost vent 112 to defrost, some of the heated air is discharged toward the rear seat passenger's face through the console vent 117 to heat the rear seat space of the vehicle, and some of the heated air is discharged toward the front seat passenger's feet and the rear seat passenger's feet through the floor channel 116 and the floor vents 114 and 115 to heat the inside of the vehicle.

In this instance, because the console vent 117 is opened half, it can prevent the excessive discharge of the air to the console vent 117 and prevent the lack of air volume of the front seat.

E. Defrost Mode (FIG. 9)

Figure 9:
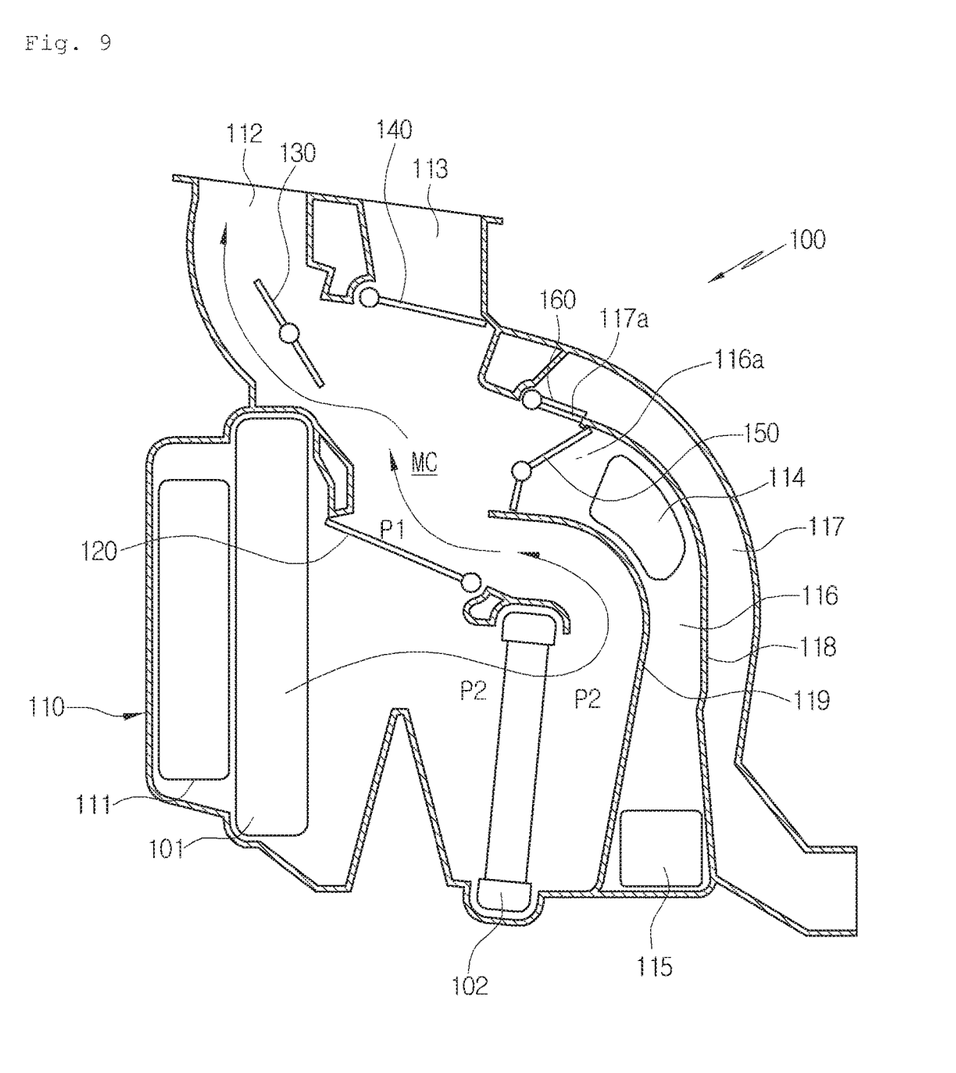
FIG. 9 is a sectional view showing a defrost mode of the air conditioner for the vehicle according to the preferred embodiment of the present invention.

In the defrost mode, as shown in FIG. 9, the face door 140 closes the face vent 113, the floor door 150 closes the inlet 116a of the floor channel 116 to closes the floor vents 114 and 115, the defrost door 130 opens the defrost vent 112, and the console door 160 closes the console vent 117.

Moreover, the temperature-adjusting door 120 opens the warm air passageway P2.

Therefore, the air blown by the air blower (not shown) is heated while passing through the heater core after passing the evaporator 101. After that, the heated air is discharged toward the front window through the defrost vent 112 to defrost.

As described above, in the present invention, as an example, the case that the mode cam 170 which includes the console air volume distribution means 175 is applied to the semi-center type air conditioner is described, but the present invention is not limited to the above, and can be applied to air conditioners of all kinds, such as the center-mounting type air conditioner and the three-piece type air conditioner, in the same way and can obtain the same effects.

What is claimed is:

1. An air conditioner for a vehicle which includes:
an air-conditioning case which has a defrost vent, a face vent and floor vents to discharge air introduced through an air inflow port;
a defrost door, a face door and a floor door which are respectively rotatably mounted through rotary shafts inside the air-conditioning case to adjust the degrees of opening of the each vents; and
a mode cam which has at least one slot connected with the rotary shaft of at least one of the doors through connecting means to make the connecting means carry out a cam motion so as to individually adjust the degree of opening of the door connected to the slot while rotating at a predetermined angle according to air discharge modes,
wherein the air-conditioning case comprises a console vent for discharging air toward the rear seat of the vehicle and a console door for adjusting the degree of opening of the console vent,
wherein the mode cam comprises console air volume distribution means which varies distribution of air volume of the console vent according to the air discharge modes in order to adjust the degree of opening of the console door,
wherein the console air volume distribution means comprises a console slot which is formed on the mode cam and is connected with a rotary shaft of the console door through the auxiliary connecting means to make the auxiliary connecting means carry out the cam motion,
wherein the console slot comprises: a closing slot part for operating the auxiliary connecting means so that the console door closes the console vent; an opening slot part for operating the auxiliary connecting means so that the console door opens the console vent the greatest; and a middle slot part for operating the auxiliary connecting means so that the console door opens the console vent less than when the console vent is opened the greatest,
wherein the air discharge modes comprise a face mode, a bi-level mode, a floor mode, a mixing mode and a defrost mode,
wherein the console slot is linked with the air discharge modes from the opening slot part to the middle slot part and the closing slot part to operate the console door,
wherein the opening slot part, the middle slot part and the closing slot part of the console slot are arranged in such a way that the degree of opening of the console vent is gradually reduced while the air discharge mode is changed successively from the face mode to the bi-level mode, the floor mode, the mixing mode and the defrost mode, and wherein when the air discharge mode is the face mode and the bi-level mode, the auxilary connecting means is at the opening slot part of the console slot, and wherein when the air discharge mode is the floor mode and the mixing mode, the auxiliary connecting means is at the middle slot part, and wherein when the air discharge mode is the defrost mode, the auxiliary connecting means is at the closing slot part of the console slot.

2. The air conditioner according to claim 1, wherein a plurality of the slots are individually formed at the edge of the mode cam, and
wherein the console slot is formed inward from the plurality of the slots in the mode cam.

3. The air conditioner according to claim 1, wherein the auxiliary connecting means comprises:
a console arm which is connected to the rotary shaft (161) of the console door in the outer surface of the air-conditioning case and has a groove of a predetermined length formed at an end portion thereof; and
a console lever which is rotatably connected to the outer surface of the air-conditioning case, whose an end portion extends to one side based on a rotational center and is connected to the groove of the console arm by a pin and whose the other end portion extends to the other side and connected to the console slot of the mode cam by a pin, so that the auxiliary connecting means operates the console door through the console lever and the console arm which carry out the cam motion along the console slot when the mode cam rotates.

4. The air conditioner according to claim 1, wherein when the face door opens the face vent the greatest, the console door is connected to a position of the opening slot part of the console slot through the auxiliary connecting means to open the console vent the greatest, and
wherein when the face door closes the face vent, the console door is connected to a position of the rest of the opening slot part of the console slot through the auxiliary connecting means to close the console vent at a predetermined angle from the greatest opening.

5. The air conditioner according to claim 1, wherein the opening slot part, the middle slot part and the closing slot part of the console slot are formed in the clockwise direction, and are formed in such a way as to have different radiuses from the rotational center of the mode cam.

6. The air conditioner according to claim 5, wherein the opening slot part, the middle slot part and the closing slot part are formed in such a way that the radiuses are gradually reduced from the rotational center of the mode cam.

7. The air conditioner according to claim 1, wherein the defrost door is independently controlled through separated operating means which is mounted on the outer surface of the air-conditioning case.

8. The air conditioner according to claim 1, wherein a floor channel for guiding the air inside the air-conditioning case to the floor vents is formed inside the air-conditioning case, the console vent is partitioned at the rear side of the floor channel, and an inlet of the console vent is formed in a partition wall, which partitions the console vent from the floor channel, and is formed above an inlet of the floor channel.

* * * * *